June 9, 1936. H. KLEIN 2,043,412
TRAP PLUG
Filed May 27, 1935
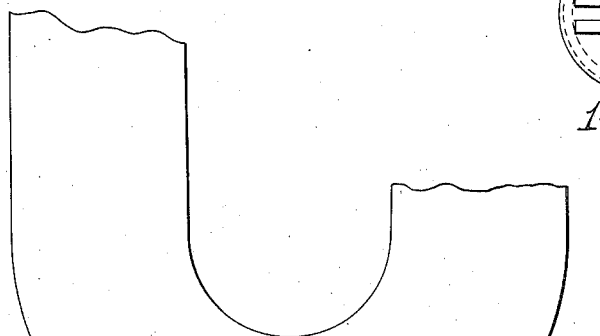
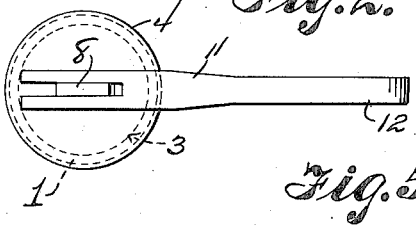
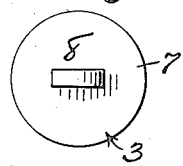
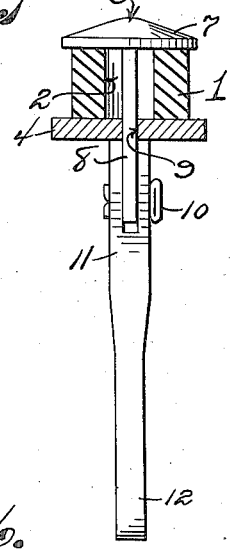
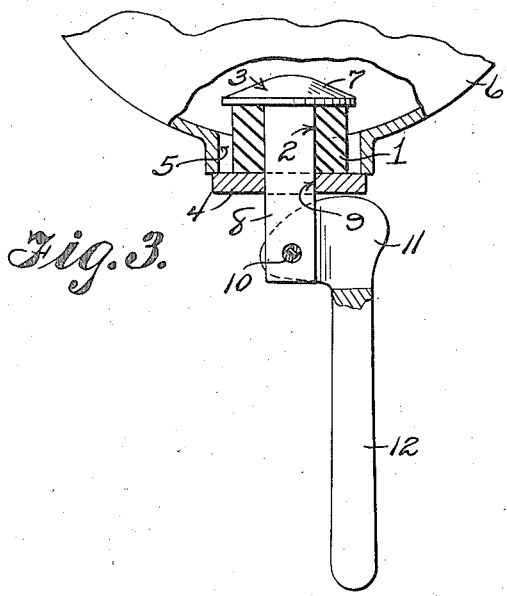
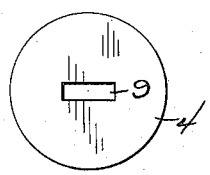
Henry Klein
INVENTOR
BY Victor J. Evans & Co.
ATTORNEY Patented June 9, 1936

2,043,412

UNITED STATES PATENT OFFICE 2,043,412

TRAP PLUG

Henry Klein, Philadelphia, Pa., assignor to Samuel Silver, Glenside, Pa., trading as K-S Specialty Company Application May 27, 1935, Serial No. 23,784

1 Claim. (Cl. 182—24)

My invention relates to improvements in plugs for closing the usual clean-out vent in the trap of a wash basin, sink, or the like.

The object of my invention is to provide a simple device of this character for closing and sealing the vent in the bend of traps of standard construction and which may be readily inserted in the vent or removed therefrom and is adapted for quick and easy manipulation to close and seal the vent without the use of tools.

Other objects together with the nature and advantages of my improvements will be readily understood when the following description and claim are read with reference to the drawing accompanying and forming a part of this specification.

In said drawing:

Figure 1 is a fragmentary view of a trap partly broken away and having my improved plug applied thereto.

Fig. 2 is a view in bottom plan of the plug detached.

Fig. 3 is a view similar to Fig. 1, illustrating the manner in which the plug is inserted in the vent of the trap, parts of the plug being shown in section.

Fig. 4 is a view in vertical transverse section, parts showing in elevation.

Fig. 5 is a view in bottom plan of a compression member forming a part of the plug, and Fig. 6 is a similar view of another compression member.

Referring in detail to the drawing, the illustrated embodiment of my invention comprises, generally speaking, a cylindrical sleeve 1 of compressible resilient material, preferably rubber, and having an axial cylindrical bore 2 therein which sleeve is interposed between two compression members 3 and 4, respectively, adapted to clampingly engage opposite ends of the sleeve 1 to compress the latter and expand the same against the interior of the vent opening 5 in the trap 6 and thereby close and seal said vent opening. One of the compression members, 3, is of bolt-like form comprising a conical head portion 7 bearing at its base against one end of the sleeve 1 and a flat shank portion 8 extending through the bore 2 of said sleeve and beyond same. The head portion 3 is of slightly smaller diameter than the vent opening 5. The other member 4 bears against the other end of the sleeve 1 and is of disc-like form, said member being provided with a central rectangular aperture 9 through and beyond which the shank portion 8 extends. The member 4 is of a proper diameter to bear against the outer edge of the vent 5 and close the same. Pivotedly mounted on the extended part of the shank portion 8, as by the cotter pin 10, is a bifurcated cam member 11 provided with a handle 12 and designed to be swung by said handle against the member 4 to effect movement of said members 3 and 4 toward each other to thereby compress the sleeve 1 between the same. Cam member 11 is designed to be swung past a dead center position, as shown in Fig. 1, to lock the members 3 and 4 in compressing position, the edge of the member 4 engaging the handle 12 and limiting movement of said cam member 11 in dead center position.

In the use of my invention the cam member 11 is swung outwardly of the member 4 to permit the sleeve 1 to assume its normal condition, the device is then inserted in the vent opening 5 with the member 4 bearing against the outer edge of said opening. With the member 4 held in this vent closing position the cam member 11 is swung on its pivot 10 by the handle 12 against the member 4 into the described dead center position, the result being that the sleeve 1 is compressed endwise and expanded radially to seal the vent opening 5. It will be noted that the bifurcated cam member 11 straddles the shank portion 8 whereby it bears against the member 4 on opposite sides of said shank portion to balance movement of said member.

The foregoing device is readily operable by an inexperienced person, is durable, economical to manufacture and thoroughly efficient for the purposes for which it was designed.

While I have described a preferred embodiment of my invention it is to be understood that right is herein reserved to changes and modifications within the scope of the claim appended hereto.

What I claim is:

A plug for closing the vent in the bend of a trap comprising a cylindrical sleeve of compressible rubber having an axial bore, a compression member of bolt-like form comprising a conical head portion bearing with its base against one end of the sleeve, and a flat shank portion extending through the bore of the sleeve and beyond the sleeve, said head portion being of slightly smaller diameter than the vent to be closed, a second compression member bearing against the other end of the sleeve and being of disc-like form, the second named compression member being provided with a central rectangular opening through and beyond which the shank portion of the first named compression member extends. the second named compression member being of sufficient diameter to bear against the outer edge of the vent to be closed, and a bifurcated cam member pivotally mounted on said shank portion and provided with a handle, said cam member being adapted to be swung by said handle against the second named compression member to effect movement of both compression members toward each other to thereby compress the sleeve between the members, said cam member being adapted to be swung past a dead center position until the second named compression member engages the handle for locking the compression members in compressing position.

HENRY KLEIN.

CERTIFICATE OF CORRECTION.

Patent No. 2,043,412.

June 9, 1936.

HENRY KLEIN.

It is hereby certified that the above numbered patent was erroneously issued to Samuel Silver, of Glenside, Pennsylvania, trading as K-S Specialty Company, as assignee of the entire interest in said invention, whereas said patent should have been issued to Henry Klein and Samuel Silver, of Glenside, Pennsylvania, individually and trading as K & S Specialty Company; as shown by the records of assignments in this office; and that the said Letters Patent should be read with this correction therein that the same may conform to the record of the case in the Patent Office.

Signed and sealed this 22nd day of September, A. D. 1936.

(Seal)

Henry Van Arsdale

Acting Commissioner of Patents.